March 6, 1956 E. A. FUGLIE 2,736,955
MEANS FOR MOVING PRESS-FIT BUSHINGS OUT
OF OR INTO CYLINDRICAL BEARINGS
Filed Nov. 26, 1951
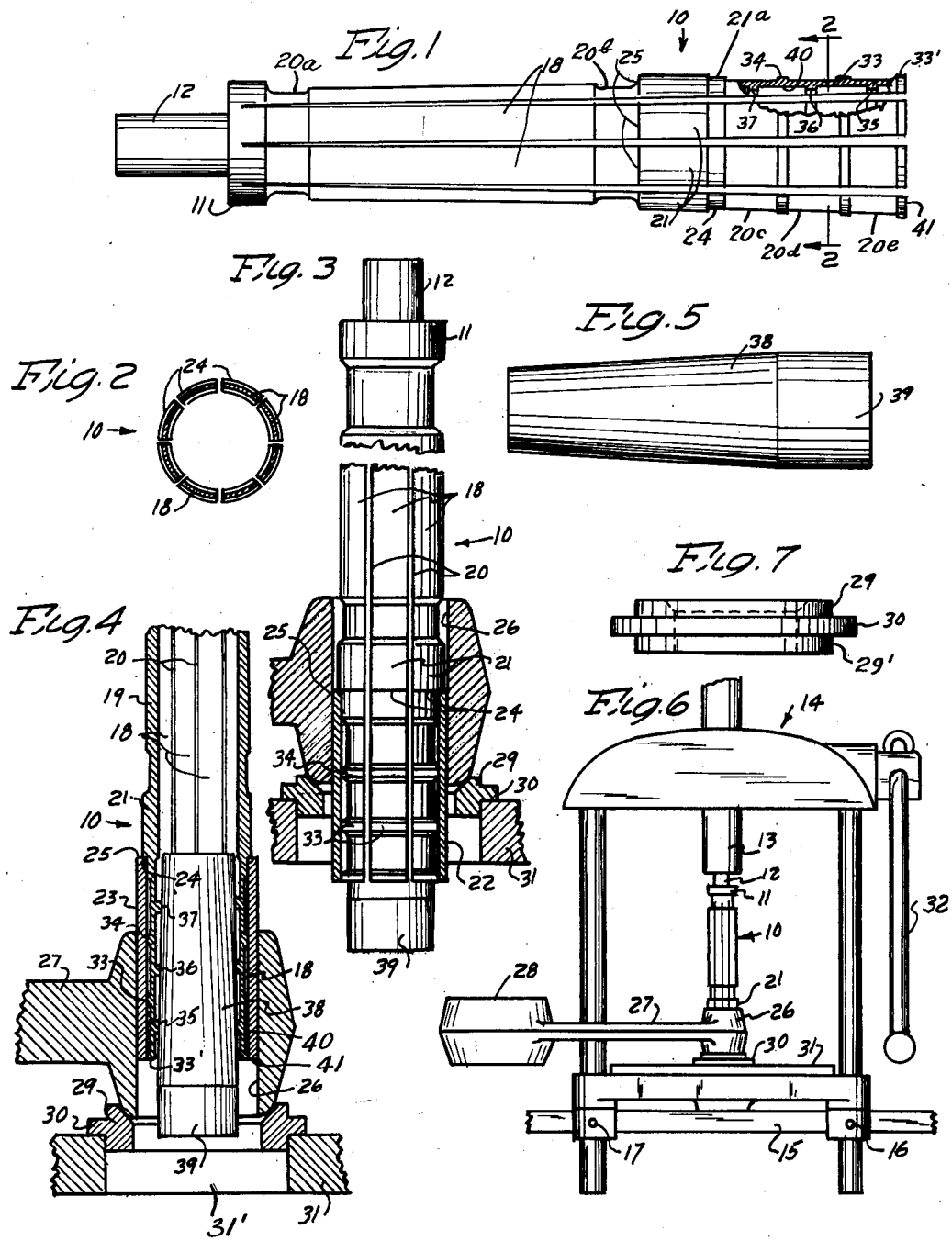
INVENTOR
ELMER A. FUGLIE
BY Whiteley and Caine
ATTORNEYS United States Patent Office 2,736,955
Patented Mar. 6, 1956

2,736,955

MEANS FOR MOVING PRESS-FIT BUSHINGS OUT OF OR INTO CYLINDRICAL BEARINGS

Elmer A. Fuglie, Winona, Minn., assignor to Winona Tool Manufacturing Company, a partnership Application November 26, 1951, Serial No. 258,130

3 Claims. (Cl. 29—275)

My invention relates to a means of moving press-fit bushings into or out of cylindrical bearings, such as piston rod bearings, and has for its object to effect engagement of a pusher member formed of a series of spring fingers yieldingly extending in circumferential relation and forming together a cylinder, a set of abutments extending in a circle about all the fingers, such that when the fingers are inserted within the bearing the abutments will engage the ends of the bearings, and employing within the bearing along the inside of the fingers a solid member whose limits will engage outside parts of the fingers, and thereafter applying to the pusher a thrust force, whereby the pusher member and its fingers and the solid member will move the bushing firmly supported throughout its circumference along its inner side either into or out of the bearings.

A great deal of difficulty has been experienced in removing these bushings after they have become so worn as to require them to be replaced by new unworn bushings. There must be a firm support to the bushing walls itself and all parts of them to prevent crumpling of the bushing and jamming which may require expensive operations to get it out. And, of course, in pressing a bushing with a press-fit into the bearing the same conditions may prevail.

I have discovered that in moving press-fit bushings into or out of a bearing the thrust force must be applied uniformly about the rim of the bushing, and unyielding support be given to all parts of the inner wall of the bushing while the movement takes place. In this connection I have discovered that if the spring fingers of the pusher member are formed with a series of transverse raised portions on each side thereof engaging the inner wall of the bushing on one side and engaging an unyielding member on the other side, the spring fingers will sufficiently support the walls of the bushing while it is being moved and at the same time have sufficient yield and spring so as not to become frozen or otherwise locked while the bushing is being moved.

I have further discovered that if the projecting or contacting portions of the spring fingers contact a solid or immovable supporting member and the outlines of the projections lie in the frustum of a cone, and the solid member is itself formed in a corresponding frustum of a cone not only can the bushing be easily and safely moved into position either within or out of the bearing, but the pusher member can readily be removed from the assemblage after the bushing has been so positioned.

An object of my invention is to provide a pusher member for moving press-fit cylindrical bushings into or out of cylindrical bearings, which comprises a multiplicity of spring fingers with their outer limits lying in a cylinder and having projecting portions on their outer sides adapted to engage the inner wall of the bushing and having projecting portions on their inner sides, the outer limits of which outline the frustum of a cone, and which are adapted to engage the outer limits of an unyielding solid member within them which is in reverse order similarly shaped as the frustum of a cone.

Another object is to provide in a device for inserting or removing bushings, a pusher formed of a relatively thin tube having a plurality of longitudinal slots therein forming separate resilient finger-like members, and in which the tube has had separated bands removed from its outer and inner surface to give added resilience to the fingers to aid in their flexure in opposite directions together with a solid member having a frustro-conical portion that extends into the interior of the tube and engages frustro-conical portions on the inner surface thereof.

It is a further object of my invention to form the members projecting from the outside and the inside of the spring fingers alternately positioned along the same in longitudinal spaced relation whereby the fingers are spring-like in character and have a yielding spring capacity between sets of projections either inside or outside.

The full objects and advantages of my invention will appear in connection with the appended specification describing the same in detail, and the novel features of the invention by which the above mentioned important and advantageous results are accomplished will be particularly pointed out in the claims.

In the drawings illustrating the operation of my invention in one of its forms.

Fig. 1 is a plan view of the bushing engaging member with some parts shown in section.

Fig. 2 is a transverse sectional view taken on line 2—2 of Fig. 1.

Fig. 3 is a vertical part sectional view taken longitudinally of the member shown in Fig. 1 and illustrating the manner in which a bushing is removed from a crankshaft bearing.

Fig. 4 is a sectional side elevation view of the member shown in Figs. 1 and 2 positioned to move a bushing into a crankshaft bearing.

Fig. 5 illustrates a form of solid member to be used within the bushing engaging member.

Fig. 6 illustrates the manner in which a crankshaft is held in a thrust pressing device for moving a bushing into or out of the crank rod bearing.

Fig. 7 illustrates a side elevation view of a form of support for the crankshaft employed in connection with the thrust press member shown in Fig. 6 and which may be of multiple size to fit any size crankshaft.

Referring to Figs. 1–4, the bushing engaging member, designated by the general reference numeral 10, consists of a thin tubular portion 19 which has a heavy shoulder 11 at one end that is united to a tubular head 12. The tubular portion 19 is provided with a plurality of longitudinal kerfs 20 extending from the outer end of portion 19 to the shoulder 11 forming six finger-like projections 18 in the surface of the tube. A series of bands 20a, 20b, 20c, 20d and 20e are formed in the outer surface of portion 19 by removing areas of metal therefrom to add flexibility to the tube. Between these bands are outwardly projecting annular portions 21, 21a, 34, 33 and 33'. As will be evident from an examination of Figs. 1, 3 and 4, the outer limits of the annular portions 21a, 34, 33 and 33' are less than the larger portion 21, because the former portions are intended to pass into and engage the interior surface of the bushing, one of which is indicated at 22 in Fig. 3, representing a worn bushing, and another is indicated at 23 in Fig. 4, representing a new bushing that would be used to replace bushing 22. The larger annular portion 21 is provided with a relatively sharp shoulder 24 which separates portion 21 from portion 21a and is intended to engage one end 25 of the bushing.

The interior portion of tubular portion 19, indicated at 40, from its outer end 41 to the annular portion 21 is tapered so as to make the outer ends of the several fingers 18 more flexible toward their outer ends. Within the interior 40 are three annular portions 35, 36 and 37 which are also formed of varying sizes so that their inner extremities lie in a frustum of a cone to uniformly engage a frustro-conical end surface 38 of a solid inserting member 39 shown in Fig. 5. The inner annular raised portions 35, 36 and 37 occur in the centers of bands 20c, 20d, and 20e in staggered relation to the outer raised portions 34, 33 and 33' to make a multiplicity of flexible areas adjacent the outer ends of the several finger-like members 18.

Since the external raised portions 33', 33, 34 and 21a on the fingers 18, which engage the inner wall of the bushing 22 or 23, alternate in spaced relation with the interior raised members 35, 36 and 37 extending inwardly from the fingers 18 are in such spaced relationship, the spring fingers have capacity for yielding in either direction from the respective outer and inner sets of projections. This not only sufficiently supports the bushing 22 or 23 against lateral or crumpling movements, but it also has the highly important effect of yielding sufficiently at the time the solid or unyielding member 38 is to be separated from the pusher fingers on the bushing to enable that separation to be certainly and effectively accomplished.

Referring now to Figs. 6 and 7 is shown a mechanism for inserting or removing bushings from an automotive crankshaft connecting rod. A press indicated generally at 14 is supported on a surface 15 by means of rods 16 and 17. A driven piece 13 which through means not shown is indirectly connected to and driven by a handle 32, provides the working action. Centered beneath the driven piece 13 is a plate 31 having a central opening 31'. An adapter 30, Fig. 7, is provided with flanges 29 and 29' and is intended to fit into the opening 31', as best seen in Figs. 3 and 4.

The bushings 22 or 23 with which this invention is concerned are adapted to fit within one end 26 of a connecting rod 27 that has a portion 29 at its other end and which is intended to surround the pin bearing of a crankshaft.

Referring now to the several figures of the drawing, the operation of the invention will be explained. In Fig. 3 the arrangement of parts are for the removal of a worn bushing 22 from portion 26 of a connecting rod, while in Fig. 4 a new bushing 23 is being inserted in place of bushing 22. To remove bushing 22 the connecting rod is disposed as seen in Fig. 6 with portion 26 engaging the flange 29 of piece 30. The device 10 is placed within the opening in portion 26 and with the shoulder 24 in engagement with the upper edge 25 of the worn bushing. The solid piece 39 is then inserted by hand into the lower portion of member 10 as it projects through the bushing and is pushed upwardly until it fits against the several inner annular portions 35, 36 and 37. Pressure is then applied to the press and the major portion of the force will be exerted between the edges 24 and 25. Because the bushing is relatively thin, it would ordinarily collapse, but this is prevented in the present invention through the effect of the frustro-conical surface 38 engaging the annular portions 35, 36 and 37, which in turn hold the outer annular portions 33', 33, 34 and 21a in contact with the inner surface of the bushing. To prevent member 10 from binding, the annular bands 20a and 20b give flexibility to the several fingers 18 in opposite directions so that the fingers 18 throughout their length are subject to a certain amount of flexibility throughout the portions 20a—20e and between the opposing annular portions 33', 35, 33, 36, 34, 37 and 21a. The principal purpose in providing the flexibility between these last mentioned portions is that otherwise the frustro-conical surface 38 tends to freeze within the interior surface 40 so that it is often virtually impossible to remove the solid member from the outer end 41 of the tubular portion. In inserting a new bushing 23 the action is only slightly different to the extent that the shoulder 24 is brought into contact with the edge 25 of the bushing prior to its being driven into portion 26 of the connecting rod. Here, particularly, the flexibility of portions 20a and 20b as well as the flexible portions 20c—20e and the annular members 33'—37 permit the solid member 39 to be removed from tubular portion 19 after the new bushing 23 is securely in place.

The principal advantage of this invention is in providing a relatively thin tubular member made up of a plurality of longitudinal fingers which have portions removed therefrom or added thereto as annular bands, partly within and partly on the outer surface of the members to give flexibility to the fingers so that a solid frustro-conical member may be inserted within the tubular portion to aid in mounting or removing a bushing, and also to permit readily removing the solid member from the outer end of the tubular pusher.

I claim:

1. A device for inserting and removing a bushing, consisting of a member composed of a plurality of relatively thin laterally curved fingers whose outer limits collectively form a cylinder, said fingers being joined to each other at a first common end of the member and separated from each other at a second common end of the member, a first band formed in all of the fingers adjacent the first common end, a second band formed in all of the fingers between their opposite ends, said bands reducing the thickness of the fingers to permit flexure in opposite directions, a cylindrical portion of increased diameter extending outwardly from the outer surface of said fingers at the side of the second band adjacent the second common end of the fingers and forming a shoulder for engaging one end of a bushing when the several fingers are inserted in the bushing, a multiplicity of narrow outwardly extending spaced apart annular projections on the outer surface of said fingers between said cylindrical shoulder and the second common end of the fingers for engaging portions of the interior of the bushing, a multiplicity of narrow inwardly extending annular projections on the interior common surface of the fingers and disposed intermediate the outwardly extending projections, said last named projections formed as successive parts of an interior frustrocone, and a solid frustro-conical member adapted for entry into the common interior surface of the fingers and engaging said last named projections for holding the fingers in yielding contact with said member.

2. A device for inserting or removing a tubular bushing, comprising a member composed of a plurality of laterally curved resilient fingers joined to each other at a first common end and separated from each other at a second common end of the member and collectively forming a tubular cylinder which is open at the second common end and which is of smaller diameter than the bushing to permit entry into the interior of the bushing, a raised portion formed on the outer surface of each of said fingers between their opposite ends and collectively forming a cylindrical shoulder of greater diameter than the bushing for abutting one end of the bushing when the second common end of the fingers are within the interior of the bushing, a multiplicity of narrow outwardly extending spaced apart annular projections on the outer surface of said fingers between the cylindrical shoulder and the second common end of the fingers for engaging portions of the interior of the bushing, a multiplicity of narrow inwardly extending annular projections on the interior common surface of the fingers and disposed intermediate the outwardly extending projections, said inwardly extending projections formed as successive parts of an interior frustrocone, and a frustroconical member adapted for entry into the common interior surface of the fingers and engaging the inwardly extending projections for holding the fingers in yielding relationship between said member and the interior of the bushing.

3. A device for inserting or removing a tubular bushing, consisting of a member composed of a plurality of laterally curved resilient fingers joined to each other at a first common end and separated from each other at a second common end of the member and collectively forming a tubular cylinder which is open at the second common end and which is of smaller diameter than the bushing to permit entry into the interior of the bushing, a raised portion formed on the outer surface of each of said fingers between their opposite ends and collectively forming a cylindrical shoulder of greater diameter than the bushing for abutting one end of the bushing when the second common end of the fingers are within the interior of the bushing, a multiplicity of narrow outwardly extending spaced apart annular projections on the outer surface of said fingers between the cylindrical shoulder and the second common end of the fingers for engaging portions of the interior of the bushing, a multiplicity of narrow inwardly extending annular projections on the interior common surface of the fingers and disposed intermediate the outwardly extending projections, said inwardly extending projections formed as successive parts of an interior frustrocone, a frustroconical member adapted for entry into the common interior surface of the fingers and engaging the inwardly extending projections for holding the fingers in yielding relationship between said member and the interior of the bushing, a first band formed in all of the fingers on the side of the raised portion nearest the first common end of the member and a second band formed in all of the fingers adjacent the first common end of the member and spaced from said first named band, said bands reducing the thickness of the fingers to permit flexure in opposite directions when the frustroconical member is inserted in the second end of said member.

References Cited in the file of this patent

UNITED STATES PATENTS

| | | |
|---|---|---|
| 736,991 | Matthews | Aug. 25, 1903 |
| 1,222,507 | Yaeckel | Apr. 10, 1917 |
| 1,357,146 | Case | Oct. 26, 1920 |
| 1,469,493 | Brown | Oct. 2, 1923 |
| 1,483,818 | Lloyd | Feb. 12, 1924 |
| 1,588,687 | Richter | June 15, 1926 |
| 1,640,489 | Donowho et al. | Aug. 30, 1927 |
| 1,652,857 | Greve | Dec. 13, 1927 |
| 2,497,498 | Hamilton | Feb. 14, 1950 |

FOREIGN PATENTS

| | | |
|---|---|---|
| 844,419 | France | Apr. 17, 1939 |